United States Patent
Cho et al.

(10) Patent No.: US 12,533,317 B2
(45) Date of Patent: Jan. 27, 2026

(54) STEM CELL-DERIVED EXOSOMES CONTAINING PAIN REGULATORS, AND USES THEREOF

(71) Applicants: EXOSTEMTECH CO., LTD., Ansan-si (KR); INDUSTRY-UNIVERSITY COOPERATION FOUNDATION HANYANG UNIVERSITY ERICA CAMPUS, Ansan-si (KR)

(72) Inventors: Yong Woo Cho, Seongnam-si (KR); Ji Suk Choi, Siheung-si (KR); Woo Sung Kim, Ansan-si (KR); Chang Hee Woo, Seongnam-si (KR)

(73) Assignees: EXOSTEMTECH CO., LTD., Ansan-si (KR); INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 666 days.

(21) Appl. No.: 17/907,653

(22) PCT Filed: Apr. 7, 2021

(86) PCT No.: PCT/KR2021/004384
§ 371 (c)(1),
(2) Date: Sep. 28, 2022

(87) PCT Pub. No.: WO2021/206459
PCT Pub. Date: Oct. 14, 2021

(65) Prior Publication Data
US 2023/0225971 A1    Jul. 20, 2023

(30) Foreign Application Priority Data
Apr. 7, 2020   (KR) .................. 10-2020-0042397

(51) Int. Cl.
| | |
|---|---|
| *A61K 9/127* | (2025.01) |
| *A61K 35/28* | (2015.01) |
| *A61K 38/20* | (2006.01) |
| *A61K 38/57* | (2006.01) |
| *A61P 29/00* | (2006.01) |

(52) U.S. Cl.
CPC ............. *A61K 9/127* (2013.01); *A61K 35/28* (2013.01); *A61K 38/2006* (2013.01); *A61K 38/2026* (2013.01); *A61K 38/2066* (2013.01); *A61K 38/57* (2013.01); *A61P 29/00* (2018.01)

(58) Field of Classification Search
None
See application file for complete search history.

(56) References Cited

U.S. PATENT DOCUMENTS

| | | | |
|---|---|---|---|
| 2017/0119682 A1* | 5/2017 | De La Rosa | A61K 9/5089 |
| 2017/0165194 A1* | 6/2017 | Meng | A61Q 19/00 |
| 2018/0036348 A1 | 2/2018 | Riordan, I | |
| 2018/0236003 A1 | 8/2018 | Banerjee et al. | |
| 2020/0323768 A1 | 10/2020 | Yi et al. | |
| 2021/0283183 A1 | 9/2021 | Cho | |

FOREIGN PATENT DOCUMENTS

| | | |
|---|---|---|
| JP | 2018-526447 A | 9/2018 |
| KR | 10-2018-0016720 A | 2/2018 |
| KR | 10-2019-0066885 A | 6/2019 |
| KR | 10-2019-0098028 A | 8/2019 |
| WO | 2019/139762 A1 | 7/2019 |
| WO | 2020/027467 A1 | 2/2020 |

OTHER PUBLICATIONS

Brini et al. (2017, Sci. Rep. 7:9904; DOI:10.1038/s41598-017-5; pp. 1-15).*
Sheng-Jie Shiue et al., "Mesenchymal stem cell exosomes as a cell-free therapy for nerve injury-induced pain in rats," Pain, 2019, p. 210-223.
Jing Chen et al., "Exosomes from human adipose-derived stem cells promote sciatic nerve regeneration via optimizing Schwann cell function," Journal of Cellular Physiology, 2019, 234, p. 23097-23110.
Anna T.Brini, "Therapeutic effect of human adipose-derived stem cells and their secretome in experimental diabetic pain", Scientific Reports, Aug. 29, 2017, 7:9904.
Jiangyi Wu, "The effect and mechanism of IPFP-MSC derived exosomes on protection of articular cartilage," China Academic Journal Electronic Publishing House, 2019.
The Extended European Search Report for European Patent Application No. 21784273.1 dated Apr. 8, 2025.

* cited by examiner

*Primary Examiner* — Elizabeth C. Kemmerer (57) ABSTRACT

The present disclosure relates to a pharmaceutical composition for relieving and treating pain based on exosomes. The exosomes according to the present disclosure contain various cytokines, gene, bioactive factors and proteins and the like related to nerve cell regeneration and pain relief secreted in the process of cell proliferation and cell behavior, and therefore, can heal fundamental causes which cause pain.

7 Claims, 5 Drawing Sheets

STEM CELL-DERIVED EXOSOMES CONTAINING PAIN REGULATORS, AND USES THEREOF

CROSS REFERENCE TO RELATED APPLICATIONS

The present application is a National Phase of International Application No. PCT/KR2021/004384 filed on Apr. 7, 2021, which claims the priority based on Korean Patent Application No. 10-2020-0042397 filed on Apr. 7, 2020, and the entire contents disclosed in the description and drawings of the corresponding application are referenced in the present application.

DISCLOSURE

Technical Field

The present disclosure relates to a pharmaceutical composition for relieving or healing various neuropathic pains such as inflammatory pain, and the like.

Background Art

Neuropathic pain is intractable pain caused by damage (continuous excitation due to an inflammatory response of major nerve cell bodies involved in pain transmission, synapse structural changes between cells such as interneurons and glial cells, damage or death of nerve cells, etc.) of central or peripheral nerve tissues by various factors (factors due to disease: cerebral hemorrhage/cerebral infarction, diabetes, herpes zoster, arthritis, etc./factors by drug treatment: various anticancer treatments), and may develop into chronic pain if the damage continues. There are various types of pain, such as spontaneous pain that occurs frequently without external stimulation, hyperalgesia in which pain is more severe than normal in response to a painful stimulus because the threshold for pain is lowered, and allodynia in which pain is felt even in response to a non-painful stimulus, and the like.

Treatment methods developed to relieve or heal pain are classified into non-drug treatment and drug treatment according to their severity. For mild cases of mild pain, pain relief is mainly induced through non-drug treatment, which alleviates pain using a sympathetic nerve block or excision method to prevent the spread of pain or a method for controlling transmission of pain signals by temporarily stimulating the corresponding site with electrical signals. On the other hand, pain relief is induced through drug therapy in case of strong pain, and mainly, symptoms are alleviated by controlling signal transmission of pain in each site using anti-inflammatory drugs (aspirin, acetaminophen, ibuprofen, nonsteroidal drugs, etc.), anticonvulsants (carbamazepine, gabapentin, etc.), antidepressants (benzodiazepines, etc.), and the like. Eventually, although there is a difference in the degree of pain, the basic principle is to block simple signal transmission and it can be seen that there is still no fundamental treatment.

Recently, studies on pain treatment using stem cells have been reported as a fundamental approach, but these stem cells have limitations such as in vivo safety (possibility of mutation into cancer cells) and low engraftment rate in the body, making it difficult to see a visible therapeutic effect. In addition, as the only composition using exosomes, a study dealing with arthritis pain using exosomes and corticosteroids collected from blood has been reported, but here, the exosomes have been used as a combination to increase the therapeutic effect of corticosteroids, and there is no confirmation of the pain treatment effect of exosomes alone, and also, exosomes collected from blood are autologous exosomes, and there is limitation of the sample amount that can be recovered from a patient himself (International Patent Application No. PCT/EP2010/069426).

Numerous documents are referenced throughout the present description and citations thereof are indicated. The disclosures of the cited documents are incorporated herein by reference in their entirety to more clearly set forth the level of the technical field to which the present disclosure pertains and the content of the present disclosure.

DISCLOSURE

Technical Problem

The present disclosure has completed the present disclosure by confirming the pain relief and healing effect using exosomes derived from stem cells, as a result of research efforts to supplement disadvantages of various previously developed treatments for pain treatment.

Therefore, an object of the present disclosure is to provide a stem cell exosome-based pharmaceutical composition containing pain control factors, which can replace a commercially available pharmaceutical composition for the conventional purpose of pain relief, improvement or healing, and to provide a use for relieving, improving or healing various neuropathic pains such as inflammatory pain and the like using it.

Specifically, an object of the present disclosure is to provide the following embodiments.

Embodiment 1. A pharmaceutical composition for use in relieving and treating pain, comprising exosomes derived from adipose-derived stem cells as an active ingredient; use of a composition comprising exosomes derived from adipose-derived stem cells as an active ingredient in the manufacture of a medicament for relieving and treating pain; or a method of relieving and treating pain, comprising administering a composition comprising exosomes derived from adipose-derived stem cells as an active ingredient into a subject in need thereof.

Embodiment 2. The pharmaceutical composition; use; or method according to Embodiment 1, wherein the adipose-derived stem cells are human adipose-derived stem cells.

Embodiment 3. The pharmaceutical composition; use; or method according to any one of the preceding embodiments, wherein the exosomes comprise an inflammatory cytokine.

Embodiment 4. The pharmaceutical composition; use; or method according to any one of the preceding embodiments, wherein the inflammatory cytokine is one or more selected from TIMP-1, TIMP-2, IL-1ra, IL-4 and IL-10.

Embodiment 5. The pharmaceutical composition; use; or method according to any one of the preceding embodiments, wherein the pain comprises inflammatory pain and neuropathic pain.

Embodiment 6. The pharmaceutical composition; use; or method according to any one of the preceding embodiments, wherein the neuropathic pain is one or more selected from the group consisting of pain accompanied by anticancer treatment, inflammatory pain, muscular pain and pain caused by peripheral nerve damage.

Embodiment 7. The pharmaceutical composition; use; or method according to any one of the preceding embodiments, wherein the adipose-derived stem cells are derived from autologous adipose tissue of a patient to whom the composition is to be administered.

Embodiment 8. The pharmaceutical composition; use; or method according to any one of the preceding embodiments, wherein the composition is an injectable formulation.

Embodiment 9. An injectable formulation comprising the pharmaceutical composition according to any one of the preceding embodiments.

Other objects and advantages of the present disclosure will become more apparent from the following detailed description, claims and drawings.

Technical Solution

One aspect of the present disclosure is to provide a pharmaceutical composition for relieving and treating pain, comprising exosomes derived from adipose-derived stem cells as an active ingredient.

The term used herein, "stem cell" is a cell which has not only self-replication ability, but also a characteristic that can differentiate into various cells by a property of multi potency, when an appropriate signal is given as needed under the influence of the environment in which the cell is located.

The stem cell of the present disclosure may be an autologous or homologous derived stem cell, and may be derived from any type of animal including humans and non-human mammals. Preferably, the stem cell may be derived from an autologous adipose tissue of a patient.

The term used herein, "adipose-derived stem cell" is a stem cell derived from an adipose tissue, and the adipose tissue has a good condition to harvest stem cells as collection of a large amount of tissues is easy, and the adipose-derived stem cell exhibits stable growth and proliferation during culturing and can differentiate into various cells when differentiation is induced.

The term used herein, "exosome" is a membrane-structured vesicle secreted from various types of cells, and is known to play various roles of inducing a strong anti-tumor immune response, including immunologically important proteins, major histocompatibility complex and a heat shock protein, and binding to other cells and tissues to deliver membrane components, proteins, RNA and the like. Therefore, exosomes containing various genetic information, proteins and growth factors related to pain relief may be used as a composition for a pain therapeutic agent.

The exosome derived from adipose-derived stem cells of the present disclosure contains a pain control factor, and therefore, can play an important role in pain relief and treatment, and specifically, as a representative cytokine secreted in relation to pain and inflammation relief, it includes TIMP-1 (tissue inhibitors of metalloproteinases-1), TIMP-2, IL-1ra (interleukin-1 receptor antagonist), IL-4 (interluekin-4), IL-10 (Interleukin-10), TGF-β (transforming growth factor-β), and the like, and these cytokines play a role of inducing inhibition of an inflammatory response and inducing inhibition of inflammatory cytokines.

The exosome may be obtained using an exosome isolation method known in the art, but not limited thereto, but may be obtained by an isolation method comprising the following steps:
1) culturing human adipose stem cells in a culture medium for proliferation and then culturing them in a serum-free and antibiotic-free medium for one day;
2) recovering cell culture supernatant;
3) centrifuging the recovered cell culture supernatant; and
4) isolating and purifying exosomes.

The exosomes prepared as above are similar to conventional technologies in terms of using a culture solution obtained in the culturing process of human adipose stem cells, but there is a difference of using a pain therapeutic agent by isolating and purifying exosomes in a nanovesicle form present in the culture solution. In this case, it is possible to effectively use only the regeneration-related proteins and various growth factors supported in the exosomes, thereby solving problems caused by medium components comprising antibiotics and serum.

In the exosomes prepared as above, not only the genetic information of stem cells, proteins and growth factors are supported, but also the exosomes themselves can even play a carrier role. Exosomes composed of lipids in a size of about 50-200 nm are cell-derived substances, and therefore, they are biocompatible and the absorption rate of cells is also very good.

In the present disclosure, the term "pain" means an unpleasant sensation and experience accompanied by actual or potential tissue damage, and includes neuropathic pain, acute pain, chronic pain, somatic pain, associated pain, visceral pain and psychogenic pain, and the like.

Neuropathic pain is pian caused by damage or functional abnormality of the nervous system, which is a pain syndrome which is intractable and chronically long-lasting, so the quality of life of patients is significantly reduced, and it causes non only pain itself but also social problems such as a productivity decline due to sleep disorder, emotional disorder such as depression, and poor social adaptability. The neuropathic pain includes pain accompanied by chemotherapy, inflammatory pain, muscular pain and pain caused by peripheral nerve damage.

Acute pain is pain caused by nociceptive stimuli caused by tissue damage by disease or trauma, and includes pain after childbirth, pain after surgery and pain after tissue damage, which usually disappear within 3 to 6 months. Chronic pain is also caused by nerve damage due to various unknown causes and changes in the nervous system according thereto, and lasts longer than the healing period of the disease or damage that caused it. For example, there are migraine headache, rheumatoid pain, diabetic pain and cancer pain, and this pain may drastically reduce the patient's quality of life and accompany depression.

Somatic pain includes superficial pain (hyperalgesia and allodynia due to skin lacerations, bruises, etc.) and deep pain caused by stimulation of nociceptors in joints, ligaments, muscles, or fascia.

Associated pain refers to pain that appears in somatic tissue far from a lesion site, and visceral pain is pain felt by nociceptive fibers distributed in intestines, and psychogenic pain refers to pain that cannot find a sufficient physical cause and cannot be explained anatomically.

The pharmaceutical composition for relieving and treating pain according to the present disclosure has a difference in that pain is fundamentally treated by administering exosomes comprising pain control factors, not a painkiller which blocks signal transmission for pain from conventional technologies.

The pharmaceutical composition according to the present disclosure may comprise one or more pharmaceutically acceptable carriers, excipients or diluents together with a pharmaceutically effective amount of exosomes derived from adipose-derived stem cells.

In the above, the pharmaceutically effective amount means an amount sufficient to improve and treat pain. The exosome derived from adipose-derived stem cells according to the present disclosure may be comprised at a concentration of $1 \times 10^7$ particles/mL to $1 \times 10^{10}$ particles/kg, preferably, at a concentration of $5 \times 10^7$ particles/mL to $1 \times 10^9$ particles/kg in the pharmaceutical composition. However, the concentration of the exosome may be appropriately changed according to the degree of pain, the age, body weight, health condition, gender, administration route and treatment period of a patient, and the like.

Furthermore, the "pharmaceutically acceptable" means a composition which is physiologically acceptable and commonly does not cause allergic reaction such as gastrointestinal disorder and dizziness, when administered into a human. The example of the carrier, excipient and diluent, may include lactose, dextrose, sucrose, sorbitol, mannitol, xylitol, erythritol, maltitol, starch, acacia gum, alginate, gelatin, calcium phosphate, calcium silicate, cellulose, methyl cellulose, polyvinyl pyrrolidone, water, methylhydroxybenzoate, propylhydroxybenzoate, talc, magnesium stearate and mineral oil. In addition, it may further comprise a filler, an anti-coagulant, a lubricant, a wetting agent, a flavoring, an emulsifier and a preservative, and the like.

In addition, the composition of the present disclosure may be administered by formulating into a formulation in a unit administration form suitable for administration into a patient's body according to a common method in a pharmaceutical field, and the formulation comprises an effective dose capable of relieving or treating pain by single or several times of administration. As an appropriate formulation for this purpose, as a parenteral administration formulation, an injectable formulation such as ample for injection, an injectable formulation such as an injection bag, and the like are preferable. The ample for injection may be mixed and prepared with an injection solution before use, and as the injection solution, physiological saline solution, glucose, mannitol, Ringer's solution, and the like may be used.

The pharmaceutical formulation may further comprise one or more pharmaceutically acceptable common inactive carriers, for example, preservatives, painless agents, solubilizers or stabilizers, or the like, in case of the injectable formulation, and bases, excipients, lubricants or preservatives, or the like, in case of formulations for local administration, other than the active ingredient.

The composition or pharmaceutical formulation of the present disclosure prepared in this way may be administered to a mammal such as rats, mice, livestock, humans and the like by various routes such as parenteral and oral administration and the like, and the administration method may be administering by all methods commonly used in the art. Although not limited thereto, it may be administered by oral, intra-rectal or intravenous, intramuscular, subcutaneous, intrauterine or intracerebroventricular injection, or the like.

Specifically, the administration method is not limited thereto, but it may be administering exosomes isolated from adipose-derived stem cells (intravenous injection), or be administering them into a pain site (topical administration).

As another aspect, the present disclosure provides an injectable formulation for relieving or treating pain comprising a pharmaceutical composition for relieving and treating pain comprising the aforementioned exosomes derived from adipose-derived stem cells as an active ingredient.

The injectable formulation may further comprise phosphate-buffered saline (PBS). In other words, the injectable formulation may be used by supporting exosomes isolated from adipose-derived stem cells in phosphate-buffered saline.

The injectable formulation may comprise hydrogel instead of phosphate-buffered saline. The hydrogel may be one or more selected from the group consisting of hyaluronic acid, gelatin, alginate, chitosan, fibrin, elastin, collagen and methyl cellulose, and specifically, may be hyaluronic acid hydrogel, but not limited thereto.

Advantageous Effects

The stem cell-derived exosomes according to the present disclosure contain various cytokines, genes, bioactive factors and proteins and the like related to nerve cell regeneration and pain relief secreted in the process of cell proliferation and cell behavior, and therefore, can heal fundamental causes which cause pain. In addition, as they are cell-derived lipid carriers, they are excellent for pain healing because they have excellent efficiency of penetration into damaged or dysfunctional nerve cells and effective factor delivery. Accordingly, the exosome composition suggested in the present disclosure is expected to be applicable to various nerve regeneration fields such as not only pain relief and treatment but also application as a cell-free therapeutic agent related to nerve cell regeneration in the future.

BRIEF DESCRIPTION OF THE DRAWINGS

FIG. 2(a) shows cytokines inside exosomes produced from proliferated adipose-derived stem cells, and FIG. 2(b) shows a comparison of cytokines between adipose-derived stem cell exosomes and umbilical cord-derived stem cell exosomes.

MODE FOR INVENTION

Hereinafter, the present disclosure will be described in more detail by examples. These examples are intended to more specifically describe the present disclosure only, and it will be obvious to those skilled in the art to which the present disclosure pertains that the scope of the present disclosure is not limited by these examples.

EXAMPLE

<Example 1> Exosome Production from Human Adipose-Derived Stem Cells Using Multiple Filter System In the process of proliferating human adipose-derived stem cells (ASC) up to passage 5, exosomes were produced.

In other words, exosomes were produced from proliferating human body adipose-derived stem cells. Specifically, the human body adipose-derived stem cells (passage 5) were cultured in a general culture medium (Dulbecco Modified Eagle Medium, DMEM containing 10% fetal bovine serum, 1% penicillin/streptomycin). Then, it was replaced with a DMEM medium without phenol red which is a serum-free, antibiotic-free medium, and maintained for 24 hours. After 24 hours, the cell culture supernatant was recovered. In the recovered cell culture supernatant, primary impurities such as cell debris, and the like were removed by passing through a bottle top (filter standard: 0.22 um) filter system. For the filtered culture solution, secondary impurities removal and exosome concentration were simultaneously conducted through tangential flow filtration (TFF) in which a filter in a 300 kDa size was equipped. For final impurities removal, it was filtered by repeating TFF several times, and then the final filtrate (inside and outside 10 mL) was recovered.

<Example 2> Basic Characteristic Evaluation of Produced Exosomes

Figure 1:
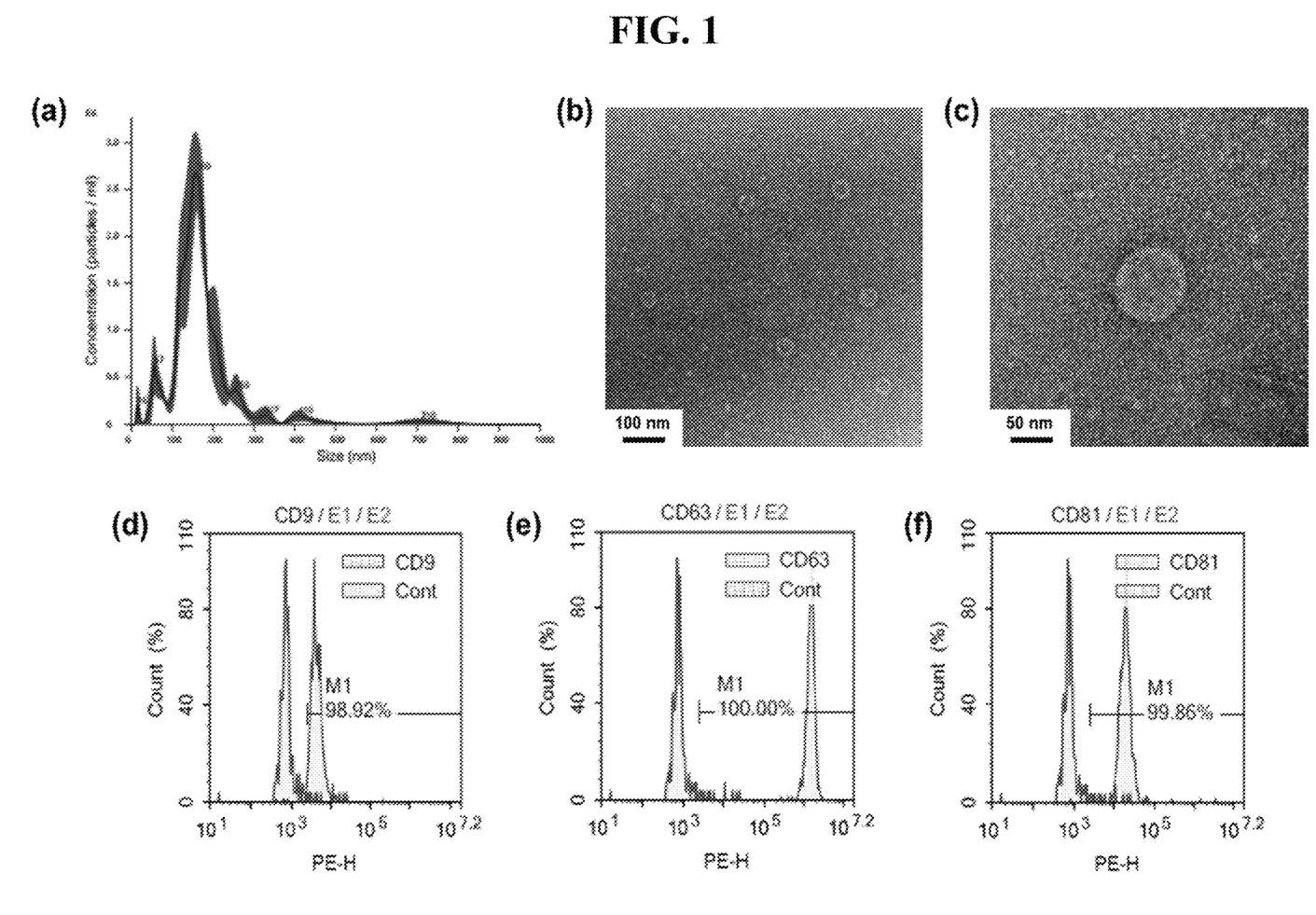
FIG. 1 is the result of basic characteristic evaluation of exosomes produced from human adipose-derived stem cells. (a) is the result of measuring the particle number of exosomes, and (b) is the microscopic photograph measured through TEM in order to confirm the form of exosomes, and (c) is the further enlarged photograph of (b), and (d~f) are surface markers (CD9/CD63/CD81) expressed on the exosome surface.

For the exosomes produced in Example 1, the particle number, size and shape were confirmed using nanoparticle tracking analysis and a transmission electron microscope, and major protein markers (CD9, CD63, CD81) expressed on the exosome surface were confirmed using flow cytometry (FIG. 1).

<Example 3> Evaluation of Pain Control Factors of Exosomes

Figure 2:
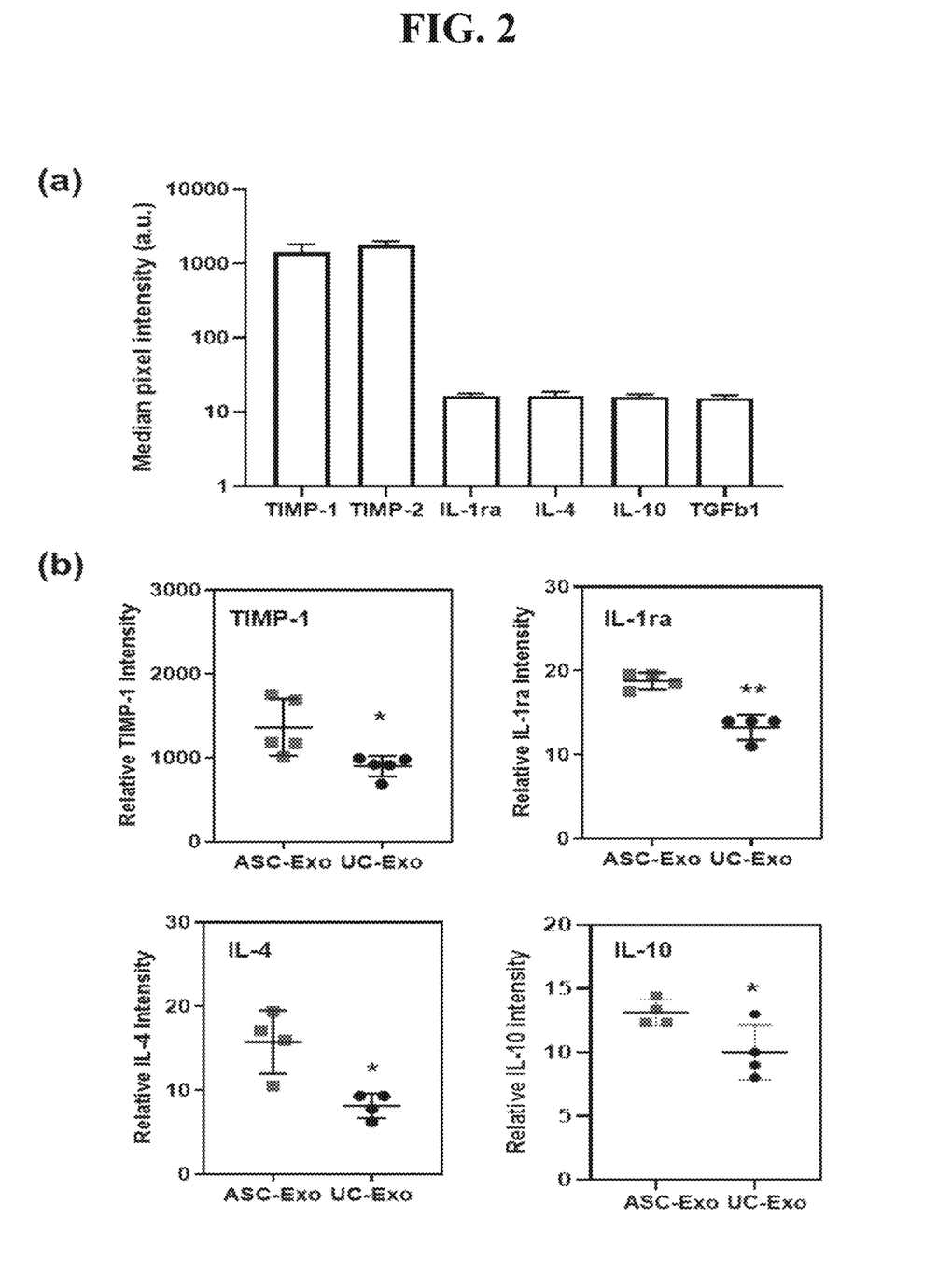
FIG. 2 is the result of analyzing pain control factors (TIMP-1, TIMP-2, IL-1ra, IL-4, IL-10) of exosomes produced from human adipose and human umbilical cord-derived stem cells.

In order to confirm pain control factors containing exosomes, cytokine analysis was conducted (FIG. 2). Then, exosomes produced from human umbilical cord-derived stem cells (human umbilical cord mesenchymal stem cells) were used as a comparative control group.

As the result of the experiment, it was analyzed that the contents of TIMP-1 and TIMP-2 known as to inhibit MMP (matrix metalloproteinase) overexpressed during pain and inflammation occurrence inside the exosomes produced from the proliferated adipose-derived stem cells (ASC-Exo), and it was confirmed that a large amount of IL-1ra, IL-4, IL-10 and TGF-β1 known as pain control cytokines were contained (FIG. 2a). In addition, it was confirmed that the contents of TIMP-1, IL-1ra, IL-4 and IL-10 inside the adipose-derived stem cell exosomes were significantly higher than the umbilical cord-derived stem cell exosomes (UC-MSC-Exo) (FIG. 2b) (*P<0.1, **P<0.01).

<Example 4> Evaluation of Pain Relief Efficacy by Exosomes Using Cell Model

Figure 3:
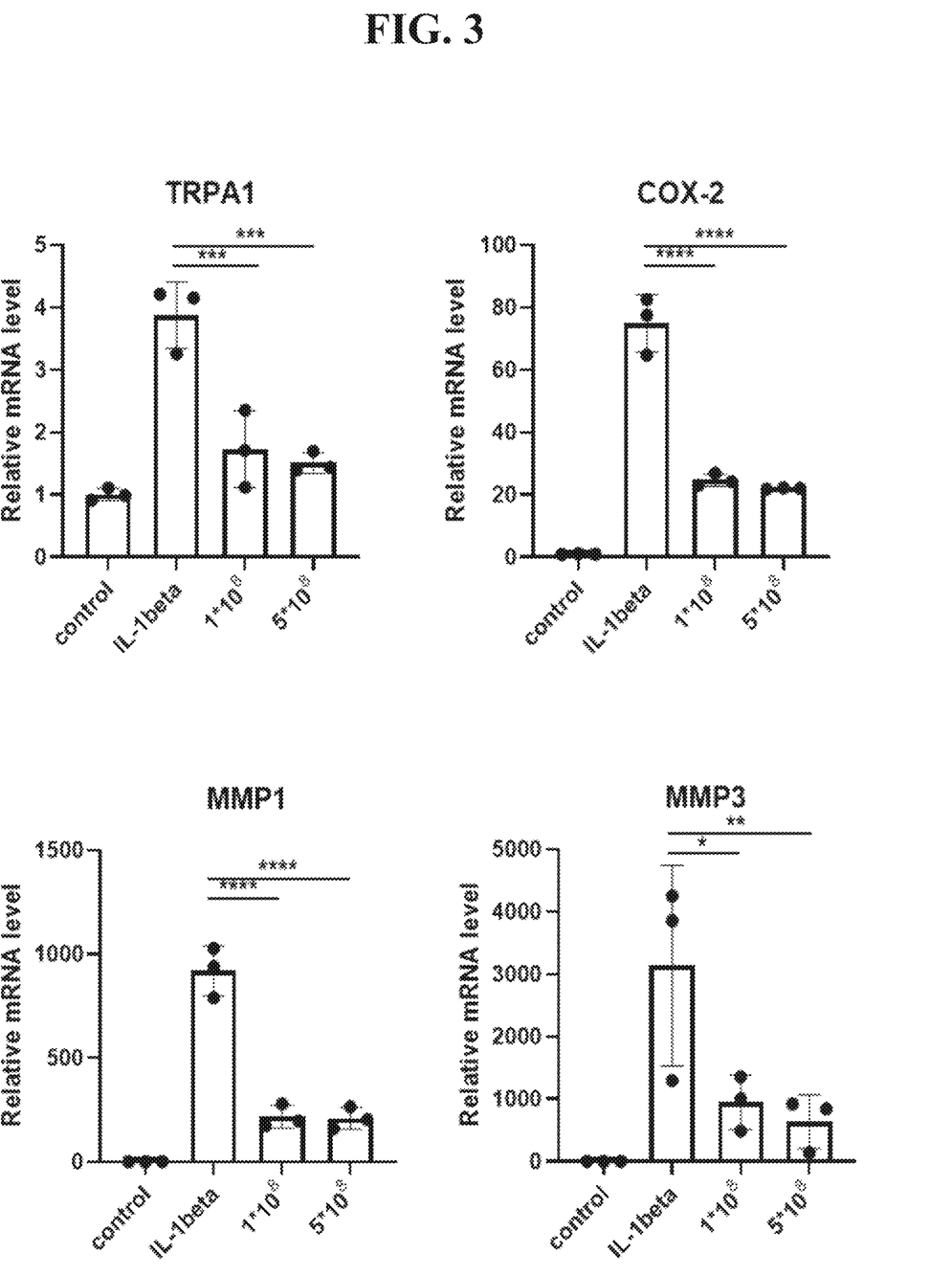
FIG. 3 is the result of evaluating pain relief efficacy of exosomes in a cell model. It was confirmed that pain-related genes such as TRPA1, COX-2, MMP1, MMP3 and the like were overexpressed in human cartilage cells in which inflammation was induced by treatment of IL-1β, and it is the result of confirming that the gene expression level is reduced by exosome treatment.

Pain gene expression inhibitory efficacy of exosomes was evaluated through a cell model in which pain was caused. As the cell model, a model in which pain was caused by adding IL-1β known as an inflammatory cytokine at a concentration of 10 ng/mL into human chondrocytes in a 6-well plate was prepared. After the exosomes were treated at 2 kinds of concentrations ($1 \times 10^8$ particles/mL, $5 \times 10^8$ particles/mL) and cell cultured for 2 days, the expression level of specific genes related to pain (TRPA1, COX-2, MMP-1, MMP-3) was evaluated by qRT-PCR (FIG. 3). In the control group, normal human chondrocytes, pain-related genes were expressed low, and in the model in which pain was caused by IL-1β, all genes were expressed high. After treating the exosomes at 2 kinds of concentrations, it could be confirmed that the expression level of all genes was significantly reduced, and it could be confirmed that it reached a normal numerical value in case of TRPA1.

<Example 5> Evaluation of Pain Relief Efficacy by Exosomes Using Animal Model

1. Experiment Design Using Joint Pain Model

Figure 4:
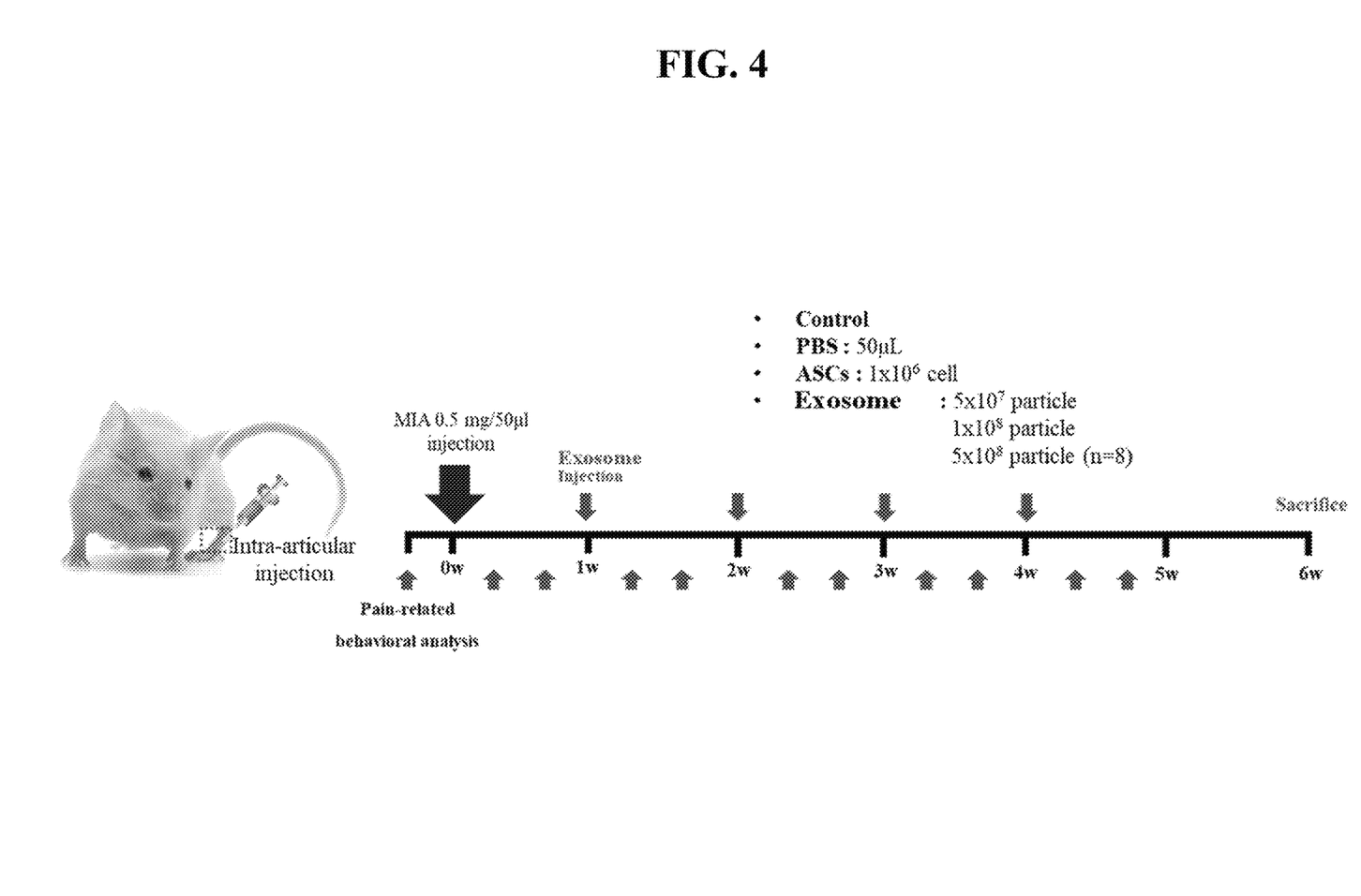
FIG. 4 shows the animal experiment outline using an MIA rat model.

From one week after injection of MIA (Monosodium Iodoacetate) drug, at weekly intervals, exosomes were injected intra-articularly a total of 4 times, and rats were sacrificed at 6 weeks. In case of the normal model, 0.9% normal saline solution was injected instead of the MIA drug, and Paw withdrawal test was performed twice a week (FIG. 4).

2. Arthritis Induction Using MIA Drug and Test Substance Administration
   (1) After anesthesia using isoflurane inhalation anesthesia, hair was removed around the left knee.
   (2) The administration site was disinfected with alcohol, and 50 μL (10 mg/mL) of an osteoarthritis-inducing substance, MIA was injected into the left knee joint cavity using a 30 gauge needle in a 100 μL Hamilton syringe.
   (3) In the normal model, 50 μL of 0.9% normal saline was injected into the left knee joint cavity.
   (4) One week after inducing arthritis, exosomes were injected at a concentration of $5 \times 10^7$ particles/50 μL, $1 \times 10^8$ particles/50 μL, $5 \times 10^8$ particles/50 μL at weekly intervals for weeks a total of 4 times, and in case of adipose-derived stem cells (ASCs), $1 \times 10^6$ cells/50 μL was injected once.

3. Analysis Method (Paw Withdrawal Threshold (PWT) Analysis)
   (1) To measure PWT, animals were transferred to test analysis equipment and acclimatized for 10 minutes to reduce stress caused by environmental changes.
   (2) After placing the needle of "Touch stimulator" in the center of the rat's sole, mechanical stimulation was applied to the rat's sole by pressing the start key.
   (3) The avoidance response threshold, which is the lowest intensity that induces an avoidance response to a mechanical stimulus, was observed.

4. Statistical Analysis

The data collected through the test were expressed as mean and standard deviation between groups, and the analysis was statistically analyzed using GraphPad prism. Statistical analysis was performed using One-way ANOVA, and significance analysis was performed for differences between groups using Dunnett's multiple comparisons test. p value; *p<0.05, p<0.01, *p<0.001, ****p<0.0001

5. Test Results

Figure 5:
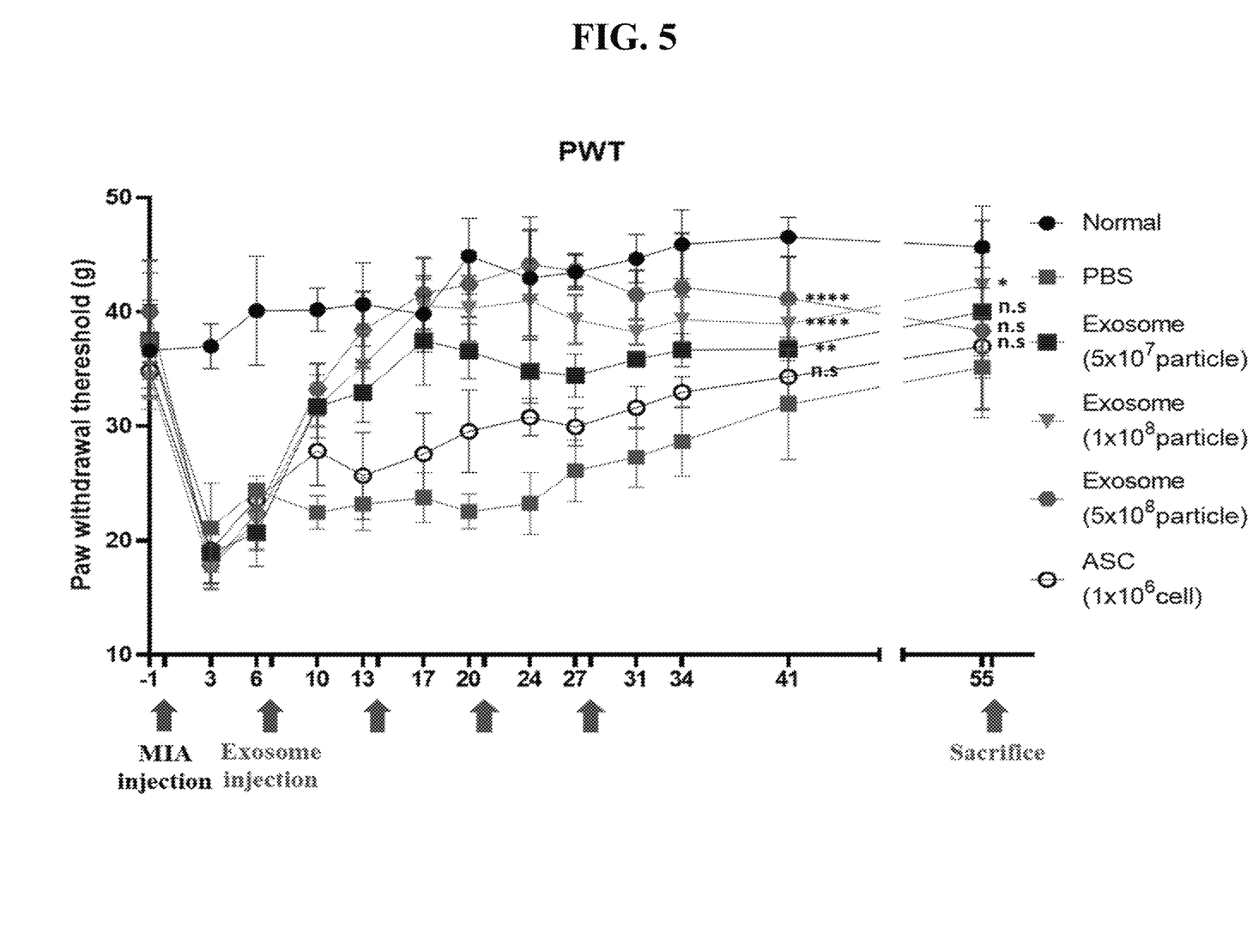
FIG. 5 shows the PWT analysis result using Dynamic Plantar Aesthesiometer.

In normal animals without pain, the threshold value of avoidance response to mechanical stimulation was measured the highest, and the value of the control group administered with PBS after induction of arthritis was shown as the lowest. The group administered with ASCs did not differ significantly from the control group. On the 41st day from the start of the test, it was found that the threshold value of avoidance response was significantly higher than the control group in all groups administered with exosomes, and on the last 55th day, it was found that the value was significantly increased in the exosome $1 \times 10^8$ particle administration group compared to the control group (FIG. 5).

The invention claimed is:

1. A method of relieving and treating pain, comprising administering isolated and purified exosomes derived from adipose-derived stem cells as an active ingredient to a subject in need thereof,
wherein the exosomes comprise one or more anti-inflammatory cytokines selected from the group consisting of TIMP-1 and TIMP-2.

2. The method according to claim 1, wherein the adipose-derived stem cells are human adipose-derived stem cells.

3. The method according to claim 1, wherein the exosomes further comprise one or more anti-inflammatory cytokine selected from IL-1ra, IL-4 and IL-10.

4. The method according to claim 1, wherein the pain includes inflammatory pain and neuropathic pain.

5. The method according to claim 4, wherein the neuropathic pain is one or more selected from the group consisting of pain accompanied by anticancer treatment, inflammatory pain, muscular pain and pain caused by peripheral nerve damage.

6. The method according to claim 1, wherein the adipose-derived stem cells are derived from autologous adipose tissue of the subject to whom the exosomes are to be administered.

7. The method according to claim 1, wherein the exosomes are comprised in an injectable formulation and the administration is carried out by administering the injectable formulation to the subject.

* * * * *